I. A. SEIDERS.
CYLINDER COCK.
APPLICATION FILED OCT. 1, 1917.
1,267,002.
Patented May 21, 1918.
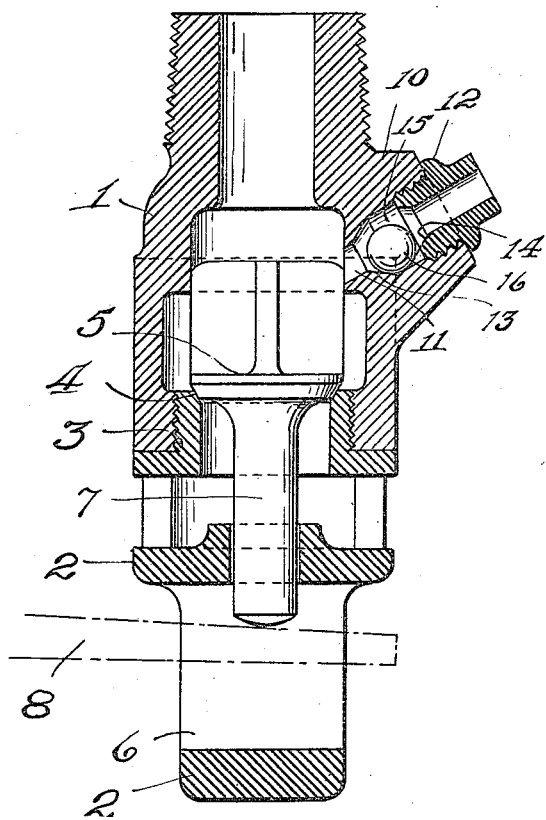
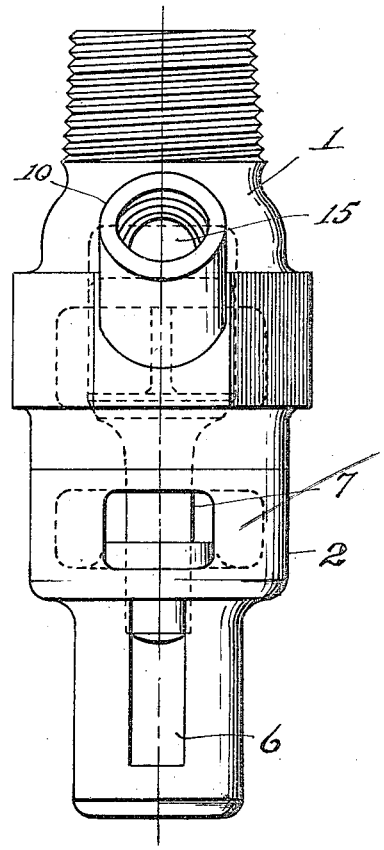
Irwin A. Seiders,
Inventor
By
Attorney

UNITED STATES PATENT OFFICE.

IRWIN A. SEIDERS, OF READING, PENNSYLVANIA.

CYLINDER-COCK.

1,267,002.

Specification of Letters Patent.  Patented May 21, 1918.

Application filed October 1, 1917.  Serial No. 194,203.

*To all whom it may concern:*

Be it known that I, IRWIN A. SEIDERS, a citizen of the United States, residing at Reading, in the county of Berks and State of Pennsylvania, have invented certain new and useful Improvements in Cylinder-Cocks, of which the following is a specification.

This invention relates to improvements in cylinder cocks, and it pertains more particularly to cocks used on the cylinders of locomotive engines.

The object of the invention is to provide a device in the form of a cock, which will insure the proper drainage of the cylinder at all times, whether the engine is at rest or in motion.

A particular feature of the invention is to provide means for automatically opening the cock when the engine stops, thus eliminating dependence on the manually operable valve opening.

A further object is to provide means to prevent the entrance into the valve of foreign matter.

The invention contemplates a cock in which the valve is capable of being operated manually, as usual, to tap the cylinder, and in addition thereto, a second valve, provided with two valve seats, and a ball valve adapted to seat on one of said valve seats when the cylinder is under pressure, and on the other valve seat when the engine is running, as for instance on a down grade, and without pressure in the cylinder, while, when the engine is at rest and the cylinder is free from pressure, the ball valve will assume a neutral position, leaving both its passages open and permitting drainage therethrough.

The invention is more fully described in the following specification and clearly illustrated in the accompanying drawing, in which:—

Figure 1 is a front elevational view of my cylinder cock.

Fig. 2 is a central vertical sectional view thereof.

In the drawing:—

The numeral 1 designates the body portion of the cock and 2 the closure therefor and this portion 2 is formed with a screw-threaded sleeve 3 adapted to enter the body of the body portion 1. This sleeve 3 is formed at its upper extremity with a valve seat 4, and a valve 5 is adapted to seat thereon.

The portion 2 of the body is formed with a transverse passageway 6 and the valve 5 is formed with a depending valve stem 7, the lower extremity of which extends into this passageway, and the numeral 8 designates the end of an operating lever, adapted to contact with the valve stem for the purpose of opening the cock.

The body portion 1 of the cock is formed with a lug 10 through which an opening 11 is formed, communicating with the interior of the cock, and into this opening I place a hollow, externally screw-threaded plug 12. The opening 11 is formed with a valve seat 13 and the inner end of the plug is formed with a like valve seat 14, while, in a chamber 15, forming a part of the opening 11 and lying betwen the two valve seats 13 and 14, I place a ball valve 16, adapted to normally lie in said chamber free from contact with either valve seat, thus allowing a direct outlet from the interior of the cock through the lug and the plug 12.

The action and operation of the cock is extremely simple.

The actuation of the manually operated lever 8, by means of any well known device, will raise the valve 4 and permit the tapping of the condensed steam in the cylinder, whether the engine is running or at rest. When however, the engine is at rest, and this tapping of the cock is neglected or omitted for any reason, the tapping will be accomplished automatically through the ball valve 16, for, when the pressure in the cylinder is relieved, the ball will fall away from its position on the seat 14, where it has been held by the steam pressure in the cylinder, and it will assume the neutral position between the two valve seats 13 and 14, as shown in the drawing, thus establishing an opening from the cylinder, through the cock and the outlet 11.

When the engine is moving, but without steam in the cylinders, as when drifting, the suction created in the cylinder will cause the ball valve 16 to seat itself on the valve seat 13, and thus effectually close the opening from the outside and prevent the entrance of any foreign matter.

It will be noted therefore that the construction thus described will permit the usual manual actuation at all times, while in motion or while at rest, and also that the supplemental valve mechanism will automatically open the cock when pressure in the cylinder ceases if the engine is at rest and automatically close the cock when pressure in the cylinder ceases and the engine is in motion.

It is evident that the details of construction may be varied, and that modifications may readily be devised without departing from the spirit of my invention as disclosed in the specification and drawing, but,

What I claim and desire to secure by Letters Patent is:—

1. A cylinder cock comprising a casing provided with a manually operable valve, and a supplemental valve in the wall of the casing, said supplemental valve having two valve seats and a single ball valve, said ball valve being actuated in one direction by pressure from within the cylinder and in the opposite direction by suction within the cylinder and adapted to assume neutral position automatically.

2. In a cylinder cock, a casing having a valve seat, a manually operable normally closed valve, a supplemental valve in the wall of the casing, said valve having two valve seats and a single ball valve, said ball valve being adapted to automatically assume neutral position between the two valve seats in the absence of pressure from either direction.

3. In a cylinder cock, a casing, a closure therefor, a valve seat on the closure member, a manually operable valve adapted to normally engage said valve seat, said casing having an opening in its wall, a valve seat formed in said opening, a plug in said opening, a valve seat on the plug and a ball valve adapted to automatically assume a central position between the two valve seats in the absence of pressure from either direction.

4. In a device of the character described, a two-part casing comprising a body portion and a closure therefor, said closure member having a valve seat thereon, a normally closed, manually operable valve adapted to engage said seat, said body portion having an opening in its side, a valve seat formed in said opening, a hollow plug in said opening, a valve seat formed on the plug and a ball valve adapted to rest normally in the opening between the two valve seats and to be actuated in one direction by pressure from within the cylinder and in the opposite direction by suction within the cylinder.

In testimony whereof I affix my signature.

IRWIN A. SEIDERS.

Copies of this patent may be obtained for five cents each, by addressing the "Commissioner of Patents, Washington, D. C."